(12) United States Patent
Ueta et al.

(10) Patent No.: US 10,237,470 B2
(45) Date of Patent: Mar. 19, 2019

(54) FOCUSING DEVICE AND CAMERA

(71) Applicant: NIKON CORPORATION, Tokyo (JP)

(72) Inventors: Souichi Ueta, Yokohama (JP); Yoshiyuki Suzuki, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/665,822

(22) Filed: Aug. 1, 2017

(65) Prior Publication Data
US 2017/0332006 A1    Nov. 16, 2017

Related U.S. Application Data

(60) Division of application No. 14/815,399, filed on Jul. 31, 2015, now Pat. No. 9,749,518, which is a
(Continued)

(30) Foreign Application Priority Data

Jul. 17, 2009 (JP) .................................. 2009-168991
Jul. 17, 2009 (JP) .................................. 2009-168992
(Continued)

(51) Int. Cl.
*G03B 13/00* (2006.01)
*H04N 5/232* (2006.01)
(Continued)

(52) U.S. Cl.
CPC ........... *H04N 5/23212* (2013.01); *G02B 7/36* (2013.01); *G03B 13/36* (2013.01); *G06K 9/4652* (2013.01);
(Continued)

(58) Field of Classification Search
None
See application file for complete search history.

(56) References Cited

U.S. PATENT DOCUMENTS 4,992,859 A    2/1991  Yoshida
5,192,998 A    3/1993  Tokumitsu et al.
9,131,142 B2   9/2015  Ueta et al.

FOREIGN PATENT DOCUMENTS

JP    S62-115408 A    5/1987
JP    H01-212981 A    8/1989
(Continued)

OTHER PUBLICATIONS

Jun. 7, 2016 Office Action issued in Japanese Patent Application No. 2015-133975.
(Continued)

*Primary Examiner* — Stephen P Coleman
(74) *Attorney, Agent, or Firm* — Oliff PLC

(57) ABSTRACT

A focusing device comprises: an image capturing unit that captures a subject image formed via an optical system including a lens for executing focus adjustment and outputs an output signal; an edge detection unit that detects an edge signal among the output signal in correspondence to each color component among a plurality of color components contained in an image based upon the output signal; a calculation unit that calculates edge differential values each of which is a differential value of the edge signal in correspondence to the each color component; and a control unit that controls a moving direction along which the lens is to move based upon a comparison of the edge differential values.

18 Claims, 13 Drawing Sheets

Related U.S. Application Data continuation of application No. 13/384,497, filed as application No. PCT/JP2010/062069 on Jul. 16, 2010, now Pat. No. 9,131,142.

(30) Foreign Application Priority Data

| | | |
|---|---|---|
| Oct. 19, 2009 | (JP) | 2009-240206 |
| Oct. 19, 2009 | (JP) | 2009-240207 |
| Jul. 16, 2010 | (JP) | 2010-161510 |
| Jul. 16, 2010 | (JP) | 2010-161511 |

(51) Int. Cl.

| | | |
|---|---|---|
| *G06K 9/62* | (2006.01) | |
| *G06K 9/46* | (2006.01) | |
| *G02B 7/36* | (2006.01) | |
| *G03B 13/36* | (2006.01) | |
| *H04N 9/04* | (2006.01) | |
| *G02B 27/00* | (2006.01) | |

(52) U.S. Cl.
CPC .......... *G06K 9/6201* (2013.01); *H04N 9/045* (2013.01); *G02B 27/0068* (2013.01)

(56) References Cited

FOREIGN PATENT DOCUMENTS

| | | |
|---|---|---|
| JP | H01-246516 A | 10/1989 |
| JP | H03-204277 A | 9/1991 |
| JP | H04-274405 A | 9/1992 |
| JP | H05-328204 A | 12/1993 |
| JP | H06-138362 A | 5/1994 |
| JP | H09-18768 A | 1/1997 |
| JP | H10-239582 A | 9/1998 |
| JP | 2002-214513 A | 7/2002 |
| JP | 2002214513 * | 7/2002 |
| JP | 2004-347665 A | 12/2004 |
| JP | 2005-86787 A | 3/2005 |
| JP | 2007-139894 A | 6/2007 |
| JP | 2009-92909 A | 4/2009 |
| JP | 2009-103800 A | 5/2009 |

OTHER PUBLICATIONS

Aug. 17, 2010 International Search Report issued in International Application No. PCT/JP2010/062069.
May 7, 2014 Office Action issued in Japanese Application No. 2010-161511.
May 7, 2014 Office Action issued in Japanese Application No. 2010-161510.
Oct. 14, 2014 Office Action issued in Japanese Application No. 2010-161510.
Oct. 14, 2014 Office Action issued in Japanese Application No. 2010-161511.
Oct. 28, 2014 Office Action issued in U.S. Appl. No. 13/384,497.
Apr. 30, 2015 Notice of Allowance issued in U.S. Appl. No. 13/384,497.
Aug. 15, 2016 Office Action issued in U.S. Appl. No. 14/815,399.
Apr. 27, 2017 Notice of Allowance issued in U.S. Appl. No. 14/815,399.

* cited by examiner

FOCUSING DEVICE AND CAMERA

This is a Divisional of U.S. patent application Ser. No. 14/815,399 filed Jul. 31, 2015, which in turn is a Continuation of U.S. patent application Ser. No. 13/384,497 (now U.S. Pat. No. 9,131,142), which is the U.S. National Stage of International Application No. PCT/JP2010/062069 filed Jul. 16, 2010. The disclosure of each of the prior applications is hereby incorporated by reference herein in its entirety.

TECHNICAL FIELD

The present invention relates to a focusing device and a camera.

BACKGROUND ART

An autofocusing device known in the related art detects an offset occurring with respect to the focusing position of a lens based upon chromatic aberration of light and corrects blurring of light in various colors by adjusting the focus based upon the detection results (see patent literature 1).

CITATION LIST

Patent Literature

Patent Literature 1: Japanese Laid Open Patent Publication No. H6-138362

SUMMARY OF INVENTION

Technical Problem

However, the autofocusing device in the related art is not capable of detecting the direction along the optical axis in which the lens position is offset relative to the focusing position.

Solution to Problem

According to the first aspect of the present invention, a focusing device comprises: an optical system that includes a focusing lens; an image sensor that captures a subject image formed via the optical system and outputs an image signal containing a plurality of color components; an edge detection unit that detects an edge in correspondence to each color component among the plurality of color components contained in the image signal; a differential value calculation unit that calculates a differential value of an edge strength of the edge detected by the edge detection unit, in correspondence to the each color component; and a decision-making unit that determines a moving direction along which the focusing lens is to move for purposes of focus adjustment of the optical system based upon the differential value calculated by the differential value calculation unit.

According to the second aspect of the present invention, in the focusing device according to the first aspect, it is preferred that the focusing device further comprises: a filter that is inserted on an optical axis extending between the optical system and the image sensor and adjusts an amount of incident light to via the optical system; and an inserting unit that inserts the filter on the optical axis and moves the filter off the optical axis. The decision-making unit determines the moving direction if the filter has been inserted by the inserting unit.

According to the third aspect of the present invention, in the focusing device according to the first or the second aspect, it is preferred that the focusing device further comprises: a drive unit that drives the focusing lens along the moving direction having been determined by the decision-making unit.

According to the fourth aspect of the present invention, in the focusing device according to any one of the first through the third aspects, it is preferred that the differential value calculation unit calculates the differential value after normalizing the edge strength, so as to ensure that the edge strength detected by the edge detection unit, no longer bears any relation to a signal value indicated for the color component.

According to the fifth aspect of the present invention, in the focusing device according to any one of the first through the fourth aspects, it is preferred that the focusing device further comprises: a focus adjustment unit that determines a lens position assumed along an optical axis of the focusing lens, at which contrast in the image signal peaks, by moving the focusing lens along the optical axis and executes the focus adjustment by moving the focusing lens toward the lens position determined. The decision-making unit determines the moving direction after the focus adjustment unit executes the focus adjustment.

According to the sixth aspect of the present invention, in the focusing device according to any one of the first through the fifth aspects, it is preferred that the focusing device further comprises: a storage unit in which correspondence information, indicating the correspondence between position information indicating various lens positions that may be assumed by the focusing lens along the optical axis thereof and differential value information indicating the differential value in correspondence to the each color component of the edge strength at each of the various lens positions that may be assumed by the focusing lens, is stored. The decision-making unit determines the moving direction based upon the differential value information indicating the differential value in corresponding to the each color component at a lens position currently assumed by the focusing lens and based upon the correspondence information.

According to the seventh aspect of the present invention, in the focusing device according to the sixth aspect, it is preferred that the plurality of color components are at least three color components; the differential value information indicating the differential value in corresponding to the each color component of at least two ratios, each representing a ratio of the differential value corresponding to one color component to the differential value corresponding to another color component among the three color components; and when the at least two ratios match each other, the focusing lens assumes a focusing position at which the subject image is formed in a focus-match state.

According to the eighth aspect of the present invention, in the focusing device according to the seventh aspect, it is preferred that the various lens positions that may be assumed by the focusing lens are set relative to the focusing position.

According to the ninth aspect of the present invention, in the focusing device according to the seventh or the eighth aspect, it is preferred that a drive extent by which the focusing lens is to be driven by the drive unit along the moving direction to reach the focusing position is set based upon the correspondence information.

According to the tenth aspect of the present invention, a camera comprises a focusing device according to any one of the first through the ninth aspects.

Advantageous Effect of Invention

According to the present invention, the specific direction along the optical axis in which the lens position is offset relative to the focusing position can be detected.

DESCRIPTION OF EMBODIMENTS

First Embodiment

Figure 1:
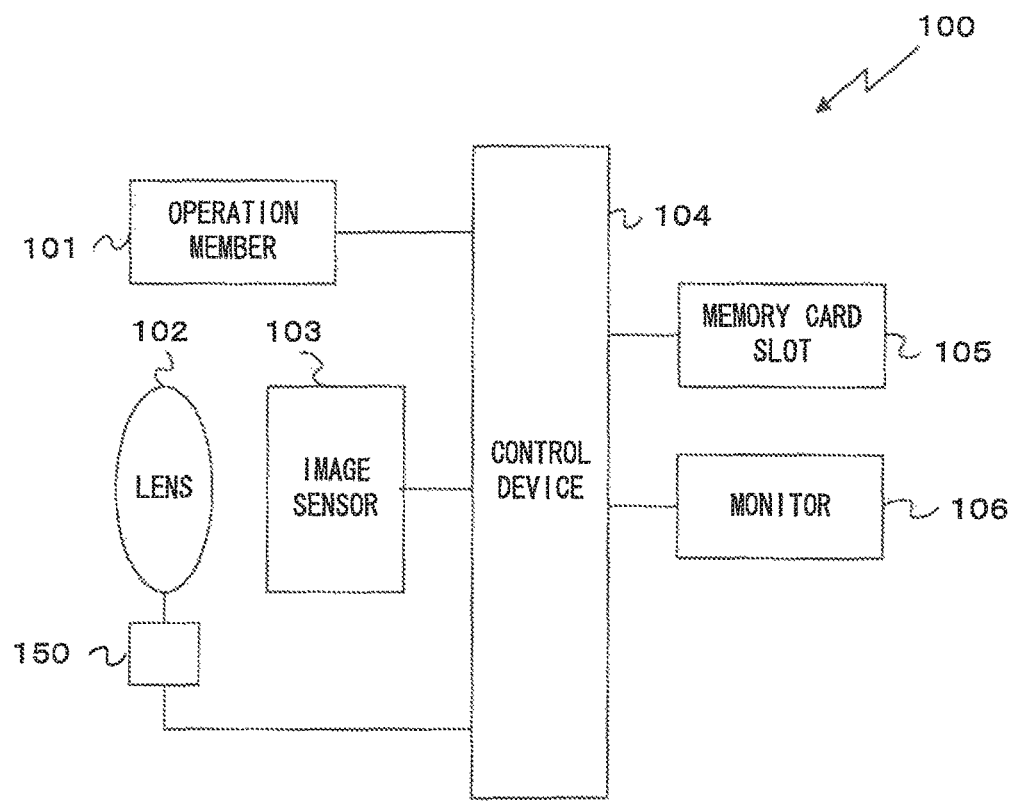
FIG. 1 A block diagram showing the structure of a camera 100 achieved in a first embodiment FIG. 2 A schematic illustration showing how the focusing position on the optical axis changes from light of one color component to light of another color component due to axial chromatic aberration FIG. 3 A flowchart of continuous AF control executed in the first embodiment while a live view image is on display FIG. 4 A specific example of a subject sample FIG. 5 A specific example of edge strength corresponding to the R, G and B color components, which are normalized in a non-focus-match state FIG. 6 A specific example of edge strengths corresponding to the R, G and B color components, which are normalized in a focus-match state FIG. 7 A specific example of edge strength differential characteristics corresponding to the individual color components, which may manifest in a non-focus-match state FIG. 8 A specific example of edge strength differential characteristics corresponding to the individual color components, which may manifest in a focus-match state FIG. 9 A diagram indicating how the differential characteristics values may change as the AF lens position changes FIG. 10 A diagram indicating how the values representing the ratios of the edge gradients corresponding to the individual color components may change FIG. 11 A block diagram showing the structure of a camera 100 achieved in a second embodiment FIG. 12 A schematic illustration indicating how the focus match position may change as an ND filter is inserted FIG. 13 A flowchart of continuous AF control executed in the second embodiment while a live view image is on display

FIG. 1 is a block diagram showing the structure of a camera 100 achieved in the first embodiment. The camera 100 includes an operation member 101, a lens 102, an image sensor 103, a control device 104, a memory card slot 105 and a monitor 106. The operation member 101 includes various input members operated by the user, such as a power button, a shutter release button, a zoom button, a cross key, a confirm button, a reproduce button and a delete button.

While FIG. 1 shows a single representative lens, the lens 102 is actually constituted with a plurality of optical lenses. In addition, the lenses constituting the lens 102 include an AF lens engaged in AF (autofocus) operation to be described later. The image sensor 103, which may be a CCD image sensor or a CMOS image sensor, captures a subject image formed via the lens 102. An image signal obtained by capturing the image is then output to the control device 104. Under the AF control to be described later, the AF lens is driven by the control device 104 via an AF motor 150. However, if the camera 100 is not equipped with an AF function, the AF lens will be driven by the control device 104 via the AF motor 150 in response to an instruction input thereto through a manual operation performed by the user.

The control device 104 generates main image data in a specific image format such as the JPEG format based upon the image signal input thereto from the image sensor 103. In addition, the control device 104 generates display image data, e.g., thumbnail image data, based upon the main image data having been generated. The control device 104 then generates an image file containing the main image data and the thumbnail image data thus generated with header information appended thereto, and outputs the image file to the memory card slot 105.

At the memory card slot 105, where a memory card used as a storage medium is loaded, an image file output from the control device 104 is written into the memory card for storage. In addition, an image file stored in the memory card is read at the memory card slot 105 in response to an instruction issued by the control device 104.

At the monitor 106, which is a liquid crystal monitor (backside monitor) mounted at the rear of the camera 100, an image in an image file stored in the memory card, a setting menu enabling selection of settings in the camera 100 and the like are displayed. In addition, as the user sets the camera 100 in a photographing mode, the control device 104 outputs display image data, expressed with image signals obtained from the image sensor 103 in time series, to the monitor 106. As a result, a live view image display is brought up at the monitor 106.

The control device 104, constituted with a CPU, a memory and other peripheral circuits, controls the camera 100. It is to be noted that the memory constituting part of the control device 104 includes an SDRAM and a flash memory. The SDRAM, which is a volatile memory, is used as a work memory where a program is opened when the CPU executes the program and as a buffer memory where data are temporarily recorded. As described later, AF lens position adjustment data, indicating the relationship between the extents to which physical quantities pertaining to individual color components and the extent of change in the AF lens position assumed within close range around the AF lens position at which a focus match is achieved for light corresponding to two different color components, are temporarily recorded into the SDRAM. In addition, in the flash memory, which is a nonvolatile memory, data for the program executed by the control device 104, various parameters which are read at the time of program execution, such as the focusing positions corresponding to the R, G and B color components for each focal length corresponding to a specific zoom position assumed at the lens 102, and the like are recorded.

As a live view image data input from the image sensor 103 starts, the control device 104 in the embodiment executes AF (autofocus) processing so as to continuously adjust the focus while the live view image is displayed. In more specific terms, the control device 104 executes focus adjustment by driving the AF lens included in the lens 102 along the optical axis through a contrast method of the known art so as to maximize the contrast indicated in the output values in the image signal input thereto from the image sensor 103. Namely, the control device 104 executes continuous AF control while the live view image is displayed.

Under standard continuous AF control executed while the live view image is displayed, the focus is adjusted by driving the AF lens along a specific direction so as to raise the contrast whenever a decrease in the contrast is detected in a focus detection area, i.e., an AF evaluation area, in a given frame among the frames of images constituting the live view image. During this focus adjustment operation, the AF lens position at which the highest level of contrast is achieved needs to be detected by executing a type of control often referred to as hill-climbing control. However, the specific direction along which the AF lens should be moved to raise the contrast, i.e., toward the close-up side extending toward the position closest to the subject, or toward the infinity side extending toward the position furthest to the subject, can only be determined by first test driving the AF lens along either direction and then detecting the contrast at the new AF lens position.

In other words, the AF processing executed under the continuous AF control while the live view image is on display in the related art is bound to require a considerable length of time whenever the contrast becomes lowered as the subject moves after a focus-match state is achieved, since the contrast must be detected by moving the AF lens along either direction and a decision must be made as to which direction the AF lens should be driven in order to achieve a focus-match state each time. Accordingly, under continuous AF control executed while the live view image is on display in the embodiment conceived to address this issue, a decision is made as to which direction the current AF lens position is offset along the optical axis relative to the focusing position without actually moving the AF lens. Then, based upon the decision-making results, the AF lens is caused to move toward the focusing position.

Figure 2:
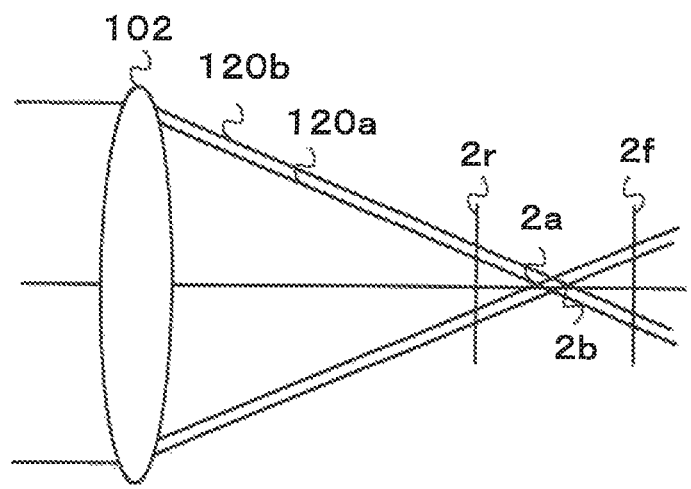

More specifically, frames of images input from the image sensor 103 may be expressed in, for instance, the RGB colorimetric system and, in such a case, the focusing position assumed on the optical axis for light constituted with a given color component differs from the focusing position assumed on the optical axis by light constituted with another color component, due to the variance among the axial chromatic aberrations manifested in correspondence to the R color component light, the G color component light and the B color component light included in the subject light. For instance, while the focusing position, i.e., the in-focus position corresponding to the G component may be at a point 2a, whereas the focusing position, i.e., the in-focus position for the R component and the B component may be at a point 2b, as shown in FIG. 2. In the embodiment, a decision is made as to whether the current AF lens position is offset along the optical axis toward the close-up side or toward the infinity side relative to the focusing position at which a focus-match state is achieved, by factoring in the variance among the focusing positions assumed on the optical axis in correspondence to the individual color components, which is attributable to the axial chromatic aberration manifesting differently for each color component and continuous AF control is executed based upon the decision-making results while the live view image is on display.

Figure 3:
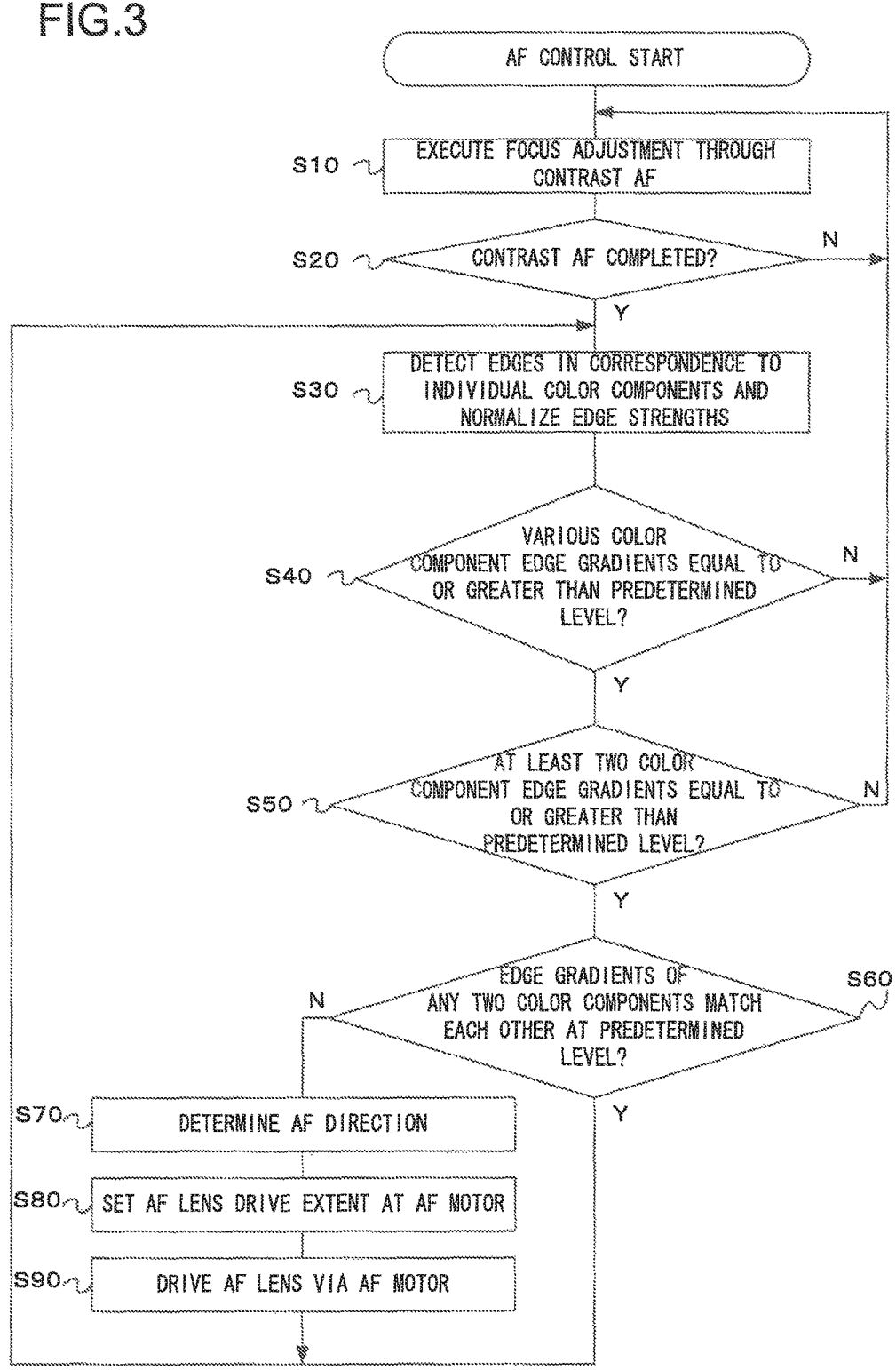

FIG. 3 presents a flowchart of the continuous AF control executed while the live view image is on display in the embodiment. The processing shown in FIG. 3 is executed by the control device 104 with a program started up as live view image data input from the image sensor 103 starts.

In step S10, the control device 104 executes focus adjustment by moving the AF lens included in the lens 102 along the optical axis through a contrast method of the known art so as to maximize the contrast of the image within an AF evaluation area set within each frame of the live view image expressed with the live view image data input thereto. As a result, a focus-match state is achieved for the subject by adjusting the focus through contrast AF processing executed at the start of live view image data input. Subsequently, the operation proceeds to step S20 to make a decision as to whether or not the contrast AF processing in step S10 has been completed. If a negative decision is made in step S20, the operation returns to step S10 to repeatedly execute the processing. If, on the other hand, an affirmative decision is made in step S20, the operation proceeds to step S30.

Figure 4:
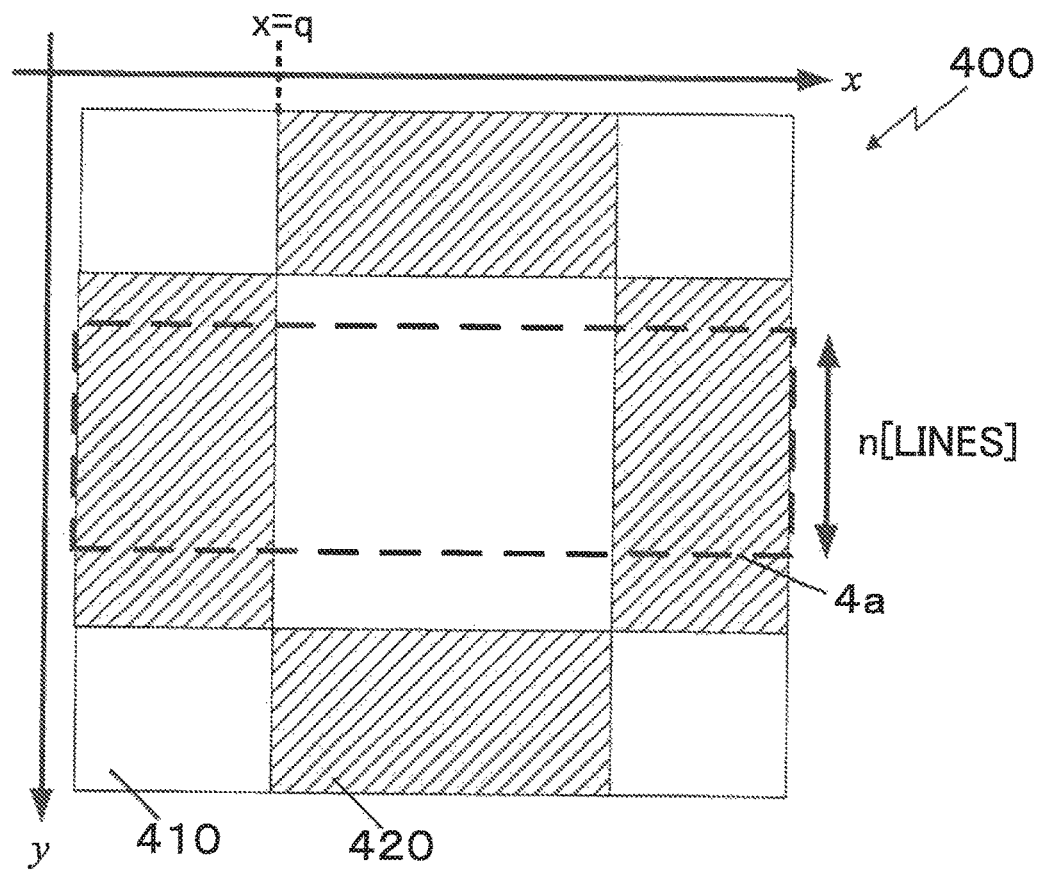

In step S30, the control device 104 detects a position at which an acute change manifests in the pixel output corresponding to each color components R, G or B, i.e., the control device 104 detects an edge, in the image in the AF evaluation area. The control device 104 then normalizes the edge amplitude, i.e., the range of values that may be taken by the pixel outputs from the pixels contained in the edge, so that the edge strength of the detected edge takes on a value equal to or greater than 0 and equal to or less than 1. In other words, the edge strength represents the pixel outputs from the pixels contained in the edge, which are normalized as described above. By normalizing the edge amplitude corresponding to the individual color components R, G and B, edge strength values, irrespective of the initial output values corresponding to the R, G and B color components, can be calculated. The following is a description of normalization of the edge amplitudes each detected in correspondence to a specific color component among the R, G and B color components in conjunction with the subject sample shown in FIG. 4. In this situation, the control device 104 calculates the average value assumed at a position assumed along a given direction x, which is the horizontal direction in the example, of edge strength values indicated over n lines (0<n≤y, e.g., over three lines, five lines or seven lines) along a direction y, i.e., the vertical direction, in correspondence to each color component among the R, G and B color components in an area 4a of the image, which is enclosed by the dotted line in the figure.

For instance, a specific number of pulses may be applied at the AF motor 150 that drives the AF lens while a live view image constituted with frames of sample images obtained by photographing the subject sample is displayed. Based upon the edge strengths r(x, y), g(x, y) and b(x, y) detected at a pixel position (x, y) in a sample image in correspondence to the R color component, the G color component and the B color component respectively, an edge strength average value r_ave(x), an edge strength average value g_ave(x) and an edge strength average value b_ave(x) for the R color component, the G color component and the B color component, at the pixel position x assumed along the direction x, each representing the average of the edge strength values over the n lines along the direction y, can be calculated as expressed in the expressions (1) through (3) below. The edge strength average values are calculated by using the edge strength values detected over the n lines rather than using the edge strength values indicated in a single line, since calculation results obtained based upon the edge strength values indicated in a single line are likely to be affected by factors such as noise.

$$r\_ave(x) = \frac{1}{n}\sum_{k=1}^{n} r(x, k) \quad (1)$$

$$g\_ave(x) = \frac{1}{n}\sum_{k=1}^{n} g(x, k) \quad (2)$$

$$b\_ave(x) = \frac{1}{n}\sum_{k=1}^{n} b(x, k) \quad (3)$$

The edge strength average value r_ave(x) for the R component, representing the average of the R component edge strength values detected over the n lines along the direction y, is calculated as expressed in the expression (1) for all the pixel positions x that may be assumed along the direction x within the area 4a. Based upon the smallest value r_ave$_{min}$(x) and the largest value r_ave$_{min}$(x) among the R component edge strength average values r_ave(x) thus calculated, the R component edge strength average values r_ave(x) at all the pixel positions x assumed along the direction x can be normalized as R(x) as expressed in the expression (4) below.

$$R(x) = \frac{r\_ave(x) - r\_ave_{min}(x)}{r\_ave_{max}(x) - r\_ave_{min}(x)} \quad (4)$$

In addition, the edge strength average value g_ave(x) for the G component, representing the average of the G component edge strength values detected over the n lines along the direction y, is calculated as expressed in the expression (2) for all the pixel positions x that may be assumed along the direction x within the area 4a. Based upon the smallest value g_ave$_{min}$(x) and the largest value g_ave$_{max}$(x) among the G component edge strength average values g_ave(x) thus calculated, the G component edge strength average values g_ave(x) at all the pixel positions x assumed along the direction x can be normalized as G(x) as expressed in the expression (5) below.

$$G(x) = \frac{g\_ave(x) - g\_ave_{min}(x)}{g\_ave_{max}(x) - g\_ave_{min}(x)} \quad (5)$$

Furthermore, the edge strength average value b_ave(x) for the B component, representing the average of the B component edge strength values detected over the n lines along the direction y, is calculated as expressed in the expression (3) for all the pixel positions x that may be assumed along the direction x within the area 4a. Based upon the smallest value b_ave$_{min}$(x) and the largest value b_ave$_{max}$(x) among the B component edge strength average values b_ave(x) thus calculated, the B component edge strength average values b_ave(x) at all the pixel positions x assumed along the direction x can be normalized as B(x) as expressed in the expression (6) below.

$$B(x) = \frac{b\_ave(x) - b\_ave_{min}(x)}{b\_ave_{max}(x) - b\_ave_{min}(x)} \quad (6)$$

Figure 5:
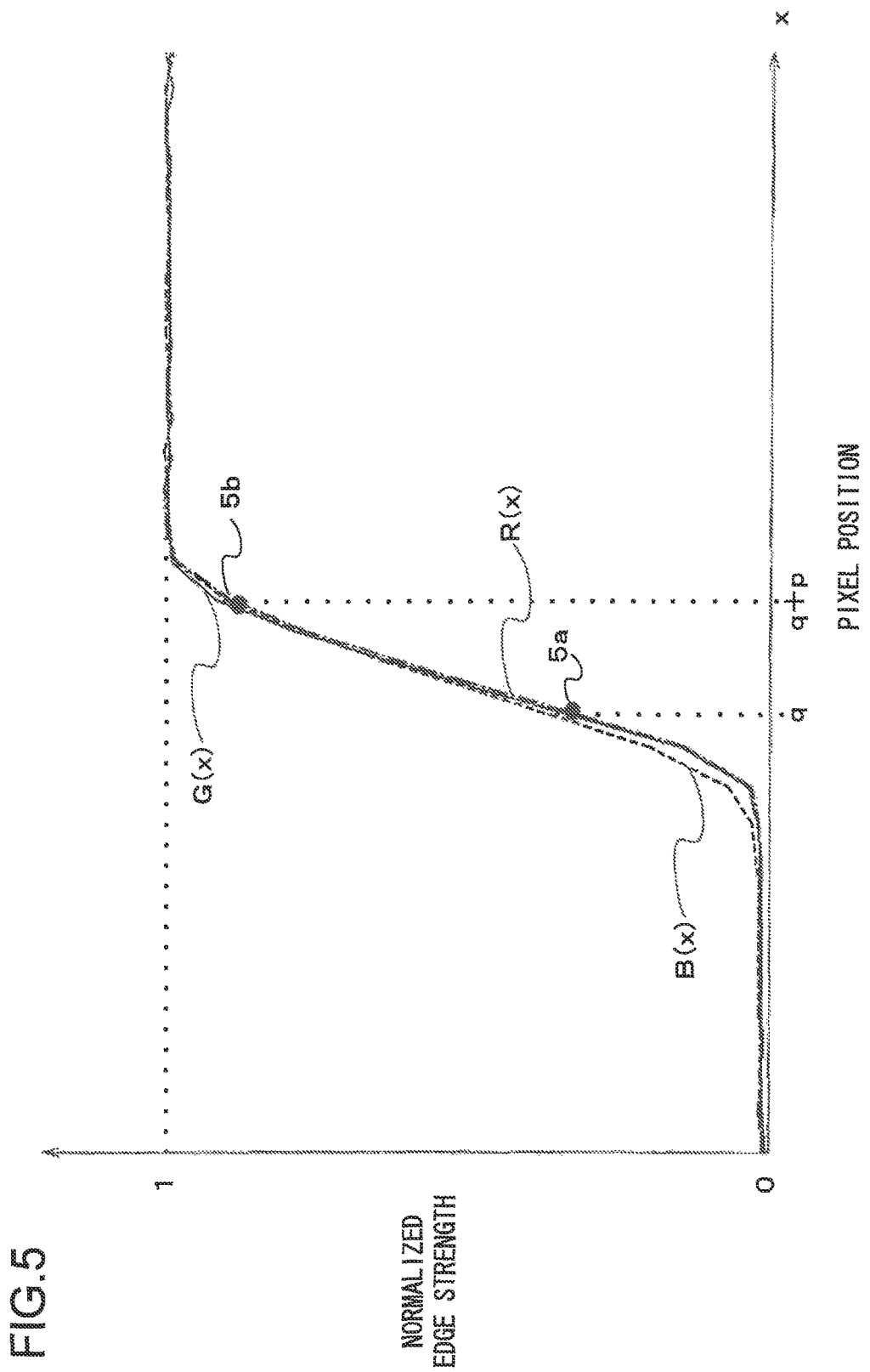
Figure 6:
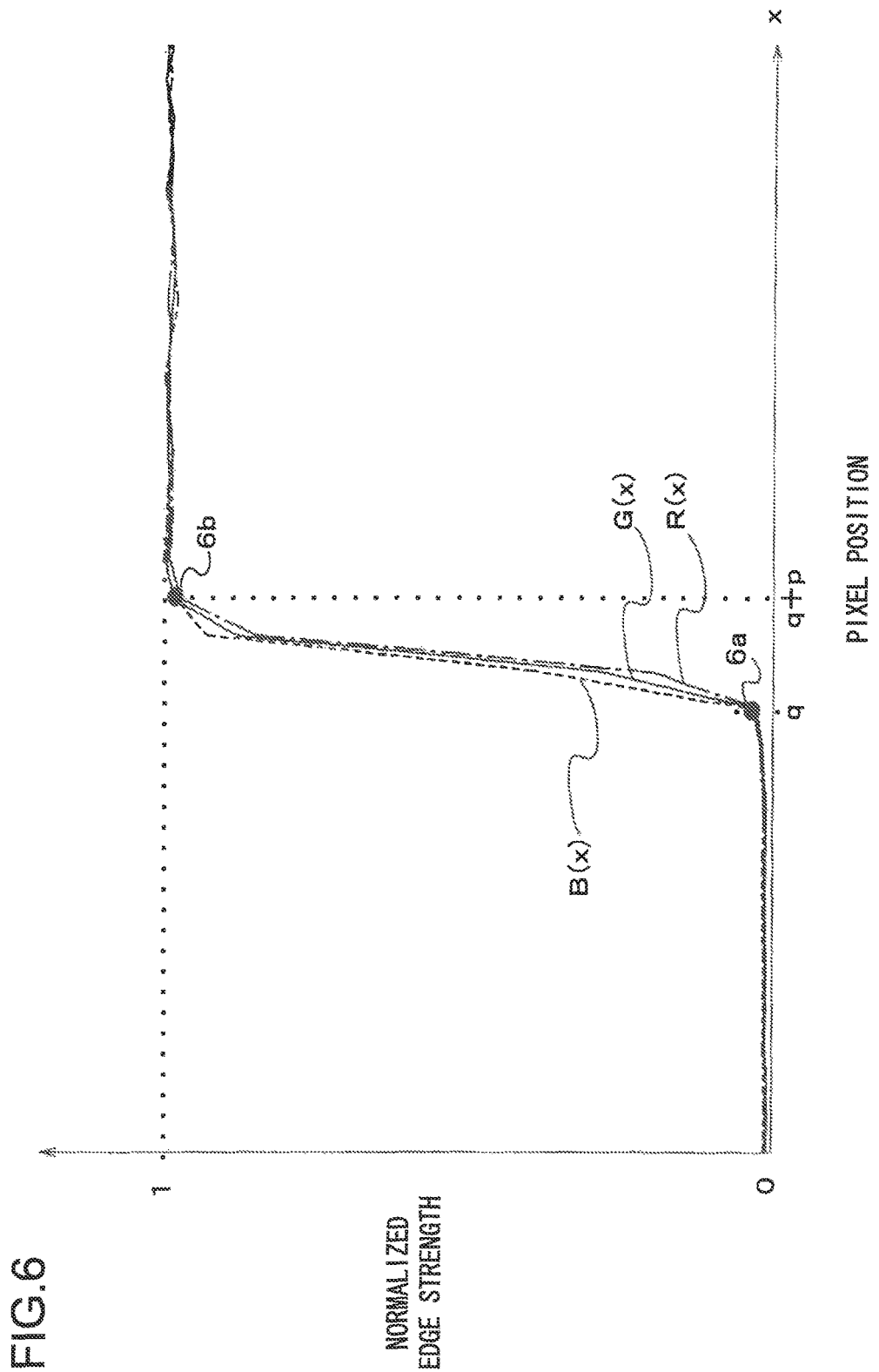

FIG. 5 shows normalized edge strengths obtained by normalizing the edge strengths corresponding to the R color component, the G color component and the B color component, in a frame of image with 139 pulses applied at the AF motor 150 driving the AF lens. FIG. 6 shows normalized edge strengths obtained by normalizing the edge strengths corresponding to the R color component, the G color component and the B color component, in a frame of image with 178 pulses applied at the AF motor 150 driving AF lens. It is to be noted that in FIGS. 5 and 6, the pixel position x assumed along the direction x is indicated on the horizontal axis, whereas the normalized edge strengths are indicated on the vertical axis.

FIG. 5 indicates that the frame of image brought up with 139 pulses are applied at the AF motor 150 is blurred, since the edge strengths corresponding to the individual color components start to increase more gently, as the value representing a pixel position x increases, to draw closer to a pixel position q. In other words, the AF lens does not take up the focusing position when 139 pulses are applied at the AF motor 150 in this example. In contrast, FIG. 6 shows the edge strengths corresponding to the individual color components increasing acutely as the value representing the pixel position x increases and reaches a point immediately preceding the pixel position q, which means that the frame of image when 178 pulses are applied at the AF motor 150 contains an in-focus image. In other words, the AF lens takes up the focusing position when 178 pulses are applied at the AF motor 150 in this example.

Subsequently, the operation proceeds to step S40, in which the control device 104 calculates edge gradients of the edges corresponding to the various color components, the edge strengths of which have been normalized in step S30, and makes a decision as to whether or not each gradient is equal to or greater than a predetermined level. In more specific terms, the control device 104 calculates the edge gradients by calculating differential characteristics manifesting edge data over a window width p (e.g., p=3) as expressed in the expressions (7) through (9) below. Namely, the edge gradient for a given color component is represented by the difference between the edge strength calculated for the particular color component at the pixel position x and the edge strength calculated for the color component at a pixel position x+p near the pixel position x.

$$R'(x)=|R(x+p)-R(x)| \quad (7)$$

$$G'(x)=|G(x+p)-G(x)| \quad (8)$$

$$B'(x)=|B(x+p)-B(x)| \quad (9)$$

Figure 7:
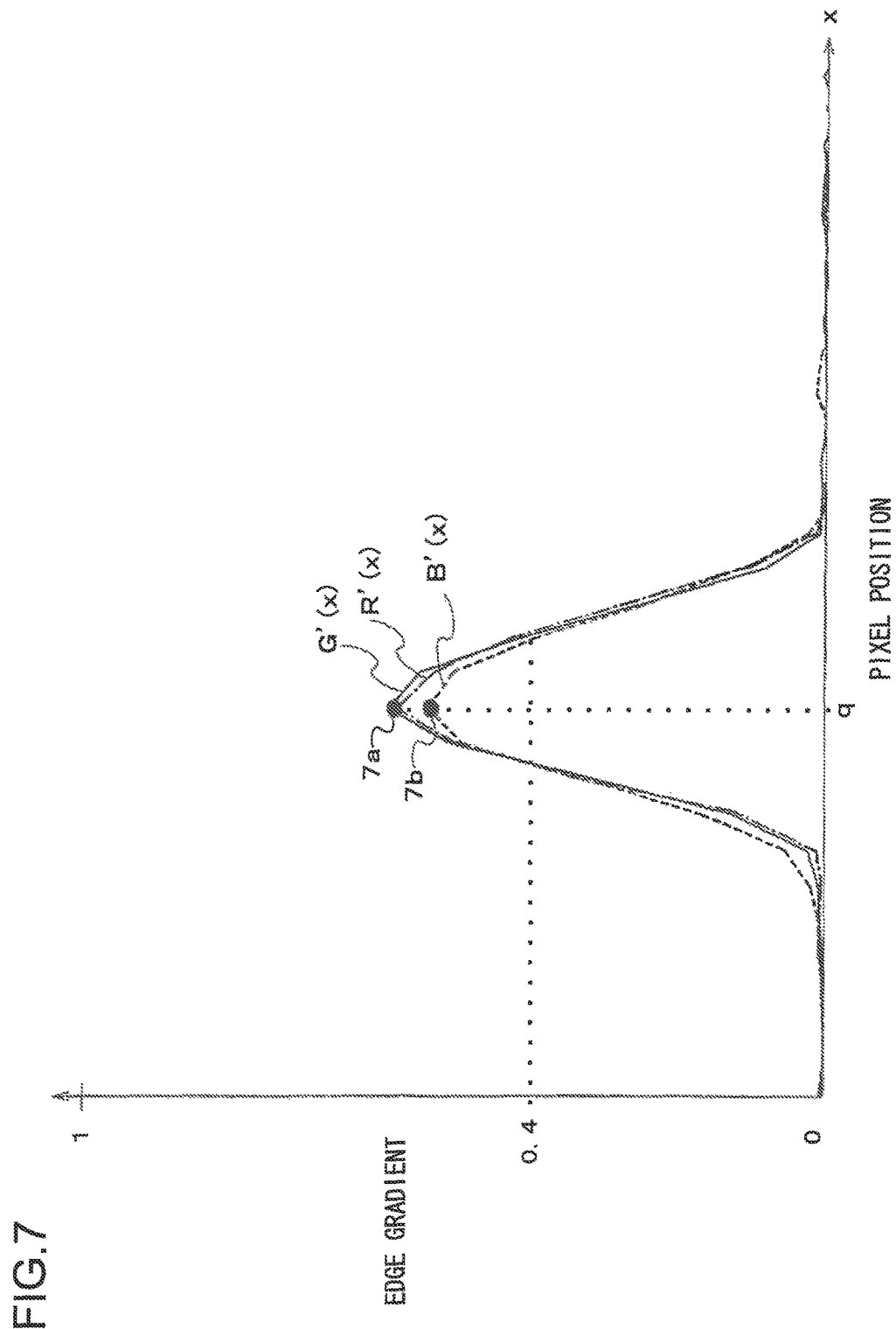
Figure 8:
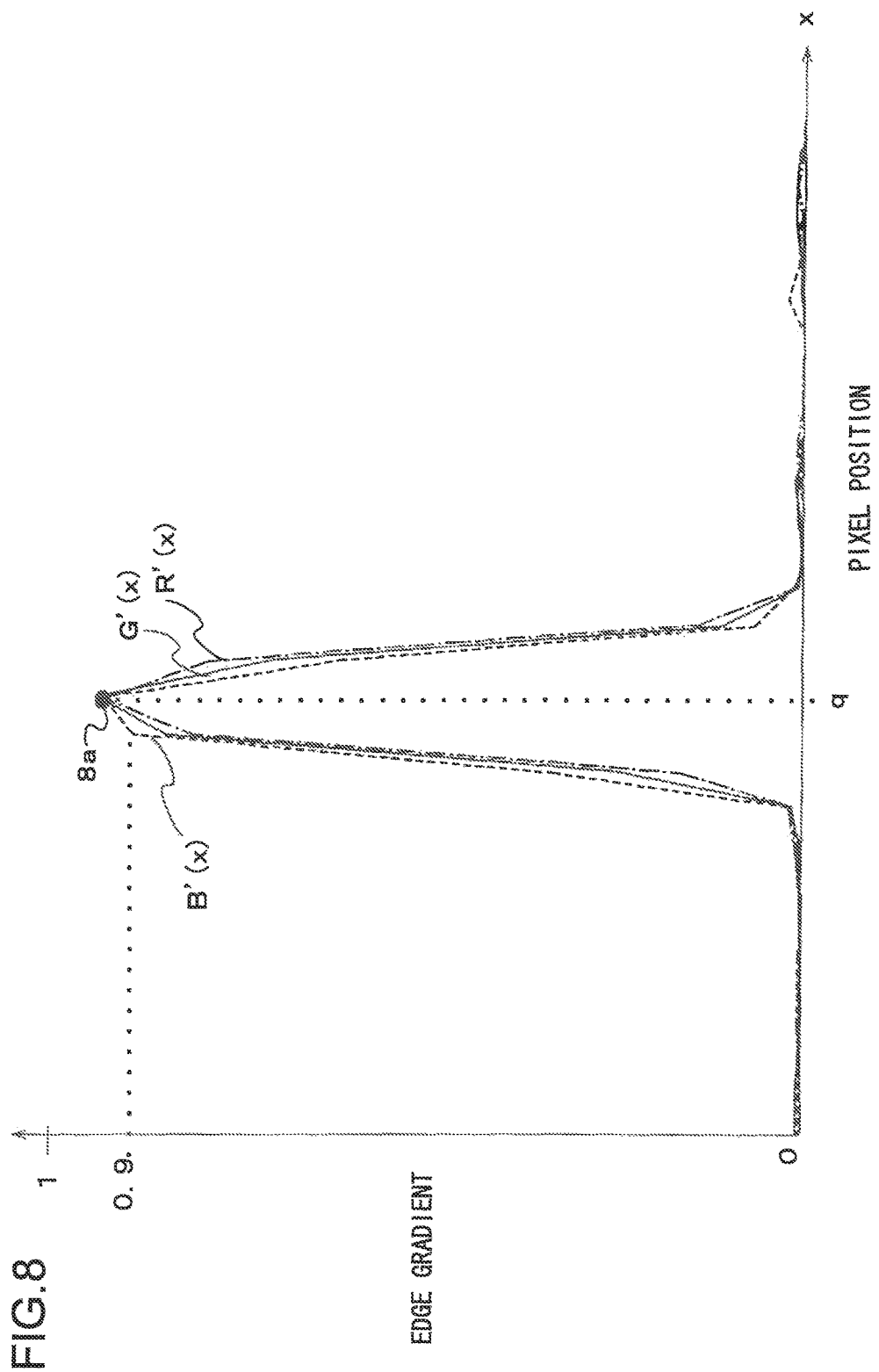

For instance, the differential characteristics of the individual color component edge strengths, i.e., the individual color component edge gradients, calculated when 139 pulses are applied at the AF motor 150 to manifest the edge strengths shown in FIG. 5, may be graphed as shown in FIG. 7. FIG. 5 indicates that the R color component edge strength curve R(x) and the G color component edge strength curve G(x) substantially cross each other at a point 5a when the pixel position x is at q and also substantially cross each other at a point 5b when the pixel position x is at q+p. For this reason, the R color component edge strength differential characteristics curve R'(x) and the G color component edge strength differential characteristics curve G'(x) achieve substantially matching peak values at a point 7a when the pixel position x is at q, as shown in FIG. 7. When the pixel position x is at q in particular, of the two pixel positions q and q+p, the B color component edge strength curve B(x) is clearly off the point 5a, and thus, the B color component edge strength curve B(x) does not completely align with the R and G color component edge strength curves R(x) and G(x) at the pixel position x=q. Accordingly, the B color component edge strength differential characteristics curve B'(x) peaks at a point 7b in FIG. 7 with a differential characteristics value different from that assumed at the point 7a, at which the R and G color component edge strength differential characteristics curves R'(x) and G'(x) peak when the pixel position x is at q. The differential characteristics of the individual color component edge strengths, i.e., the individual color component edge gradients, calculated when 178 pulses are applied at the AF motor 150 to manifest the edge strengths shown in FIG. 6, may be graphed as shown in FIG. 8. FIG. 6 indicates that the R color component edge strength curve R(x), the G color component edge strength curve G(x) and the B color component edge strength curve B(x), substantially cross one another at a point 6a when the pixel position x is at q and also substantially cross one another at a point 6b when the pixel position x is at q+p. For this reason, the R color component edge strength differential characteristics curve R'(x), the G color component edge strength differential characteristics curve G'(x) and the B color component edge strength differential characteristics curve B (x) achieve substantially matching peak values at a point 8a when the pixel position x is at q, as shown in FIG. 8. A comparison of the differential characteristics calculated as shown in FIG. 8 for the in-focus image and the differential characteristics calculated as shown in FIG. 7 for the out-of-focus image indicates that the differential characteristics of the in-focus image assume greater values, i.e., the in-focus image achieves greater edge gradient values.

Accordingly, by determining in step S40 whether or not the edge gradients are equal to or greater than a predetermined value of, for instance, 0.4, a decision can be made as to whether or not the image in the current frame has been captured in a state that can be regarded as close to a focus-match state. For instance, when the pixel position x is at q in the example presented in FIG. 7, edge gradients equal to or above 0.4 are indicated both at the point 7a, at which the R and G color component edge strength differential characteristics curves R'(x) and G'(x) peak, and at the point 7b at which the B color component edge strength differential characteristics curve B (x) peaks. In this case, a decision can be made that the image in the current frame has been captured in a near focus-match state. If a negative decision is made in step S40, i.e., if it is decided that the image has been captured in an out-of-focus state, the subject may have moved over a considerable distance from the subject position at which the focus adjustment has been executed in step S10. Under such circumstances, a focus match would not be achieved with ease simply by fine-adjusting the AF lens position. Accordingly, the operation returns to step S10 to execute the contrast AF processing again. However, if an affirmative decision is made in step S40, i.e., if the image is judged to have been captured in a state close to the focus-match state, the subject has not moved at all from the subject position at which the focus adjustment has been executed in step S10 or the subject has moved but only by a slight amount from the earlier subject position. In either case, a focus match can be achieved simply by fine-adjusting the AF lens position. Accordingly, the operation proceeds to step S50.

In step S50, the control device 104 makes a decision as to whether or not the edge gradients for at least two color components among the color components R, G and B have been detected in step S40. Unless at least two color component edge gradients are detected, e.g., if pixel values corresponding to the color components R and B are uniform without forming any edges, decision-making with regard to the AF lens drive direction, to be described below, cannot be executed. Thus, if a negative decision is made in step S50, the operation returns to step S10 to execute the contrast AF processing again. However, if an affirmative decision is made in step S50, the operation proceeds to step S60.

In step S60, the control device 104 makes a decision as to whether or not the edge gradients corresponding to any two color components among the R, G and B color components match each other at a specific level. This point is explained in more specific terms below. As described earlier, due to the variance among the axial chromatic aberrations occurring in correspondence to the individual color components R, G and B, different focusing positions are assumed on the optical axis for the individual color components. This means that the differential characteristics values R'(x), G'(x) and B'(x) calculated as expressed in the expressions (7) through (9) peak at different AF lens positions, i.e., the edge gradients for the various color components peak at different AF lens positions.

Figure 9:
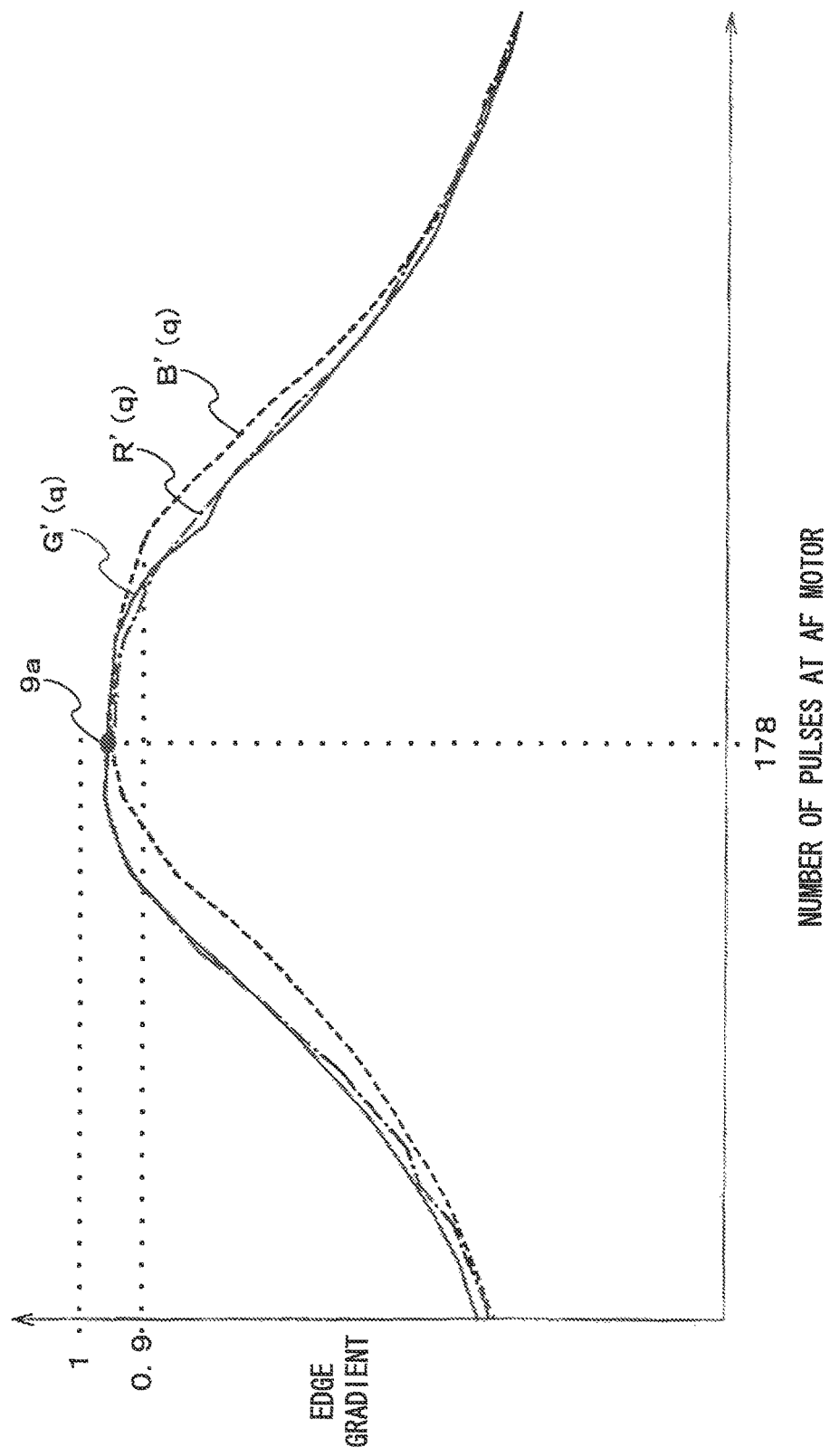

FIG. 9 shows how the differential characteristics values R'(q), G'(q) and B'(q) may change when the AF lens position changes in the example presented in FIG. 8, i.e., when the number of pulses applied at the AF motor 150 fluctuates around 178, with the pixel position x at q. As FIG. 9 indicates, the differential characteristics values R'(q), G'(q) and B'(q), representing the corresponding color component edge gradients, peak at different AF lens positions, i.e., with varying numbers of pulses applied at the AF motor 150.

In the embodiment, if the differential characteristics values corresponding to any two color components among the differential characteristics values R'(q), G'(q) and B'(q), i.e., the edge gradients, match each other at a predetermined level or higher in a range close to 1 representing the maximum edge gradient, the focus-match state is judged to be achieved and accordingly, the AF lens position remains unchanged. However, if the differential characteristics value corresponding to any two color components among the differential characteristics values R'(q), G'(q) and B'(q) do not match each other in a range equal to and above a predetermined level close to 1 representing the maximum edge gradient, the focus-match state is judged not to be achieved, and accordingly, the AF lens position is adjusted. For instance, the differential characteristics values B'(q) and G'(q) corresponding to the gradients of two color components match each other at a point 9a, which is close to 1, in the example presented in FIG. 9. Accordingly, the focus-match state is judged to be achieved and the AF lens position remains unchanged. It is to be noted that the edge gradient values corresponding to the individual color components indicated at the point 9a are equal to the differential characteristics peak values for the various color components at the pixel position x at q shown in FIG. 8, i.e., equal to the edge gradients at the point 8a.

It is to be noted that in conjunction with the decision-making method illustrated in FIG. 9, the ratios R'(q)/G'(q), B'(q)/G'(q) and R'(q)/B'(q) of the edge gradients corresponding to the various color components may be calculated and a decision may be made with regard to two ratios among the three ratios. Namely, if two ratios close to a predetermined value, e.g., 1, match each other or if the difference between two ratios, both represented by values close to 1, is within a predetermined range, the focus-match state is judged to be achieved and accordingly, the AF lens position may be left unchanged. If, on the other hand, two ratios both represented by values close to the predetermined value do not match each other, the focus-match state is judged not to be achieved and the AF lens position may be adjusted accordingly.

Figure 10:
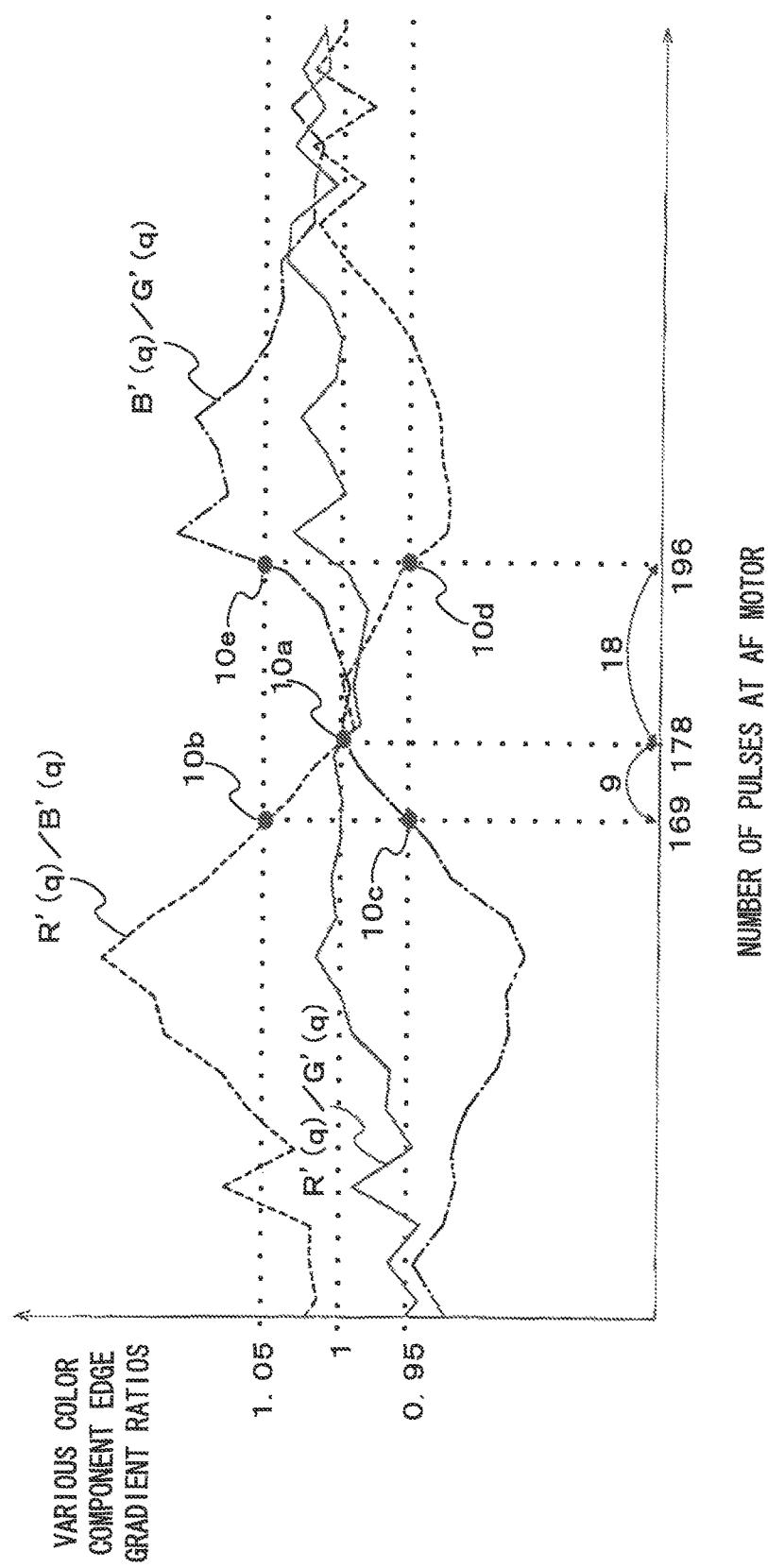

For instance, FIG. 10 shows two ratios B'(q)/G'(q) and R'(q)/B'(q), both represented by values close to 1, match each other at a point 10a. In this case, the focus-match state is judged to be achieved and the AF lens position remains unchanged. It is to be noted that the two ratios of different color component edge gradients to be used in the decision-making should be selected based upon focal length-dependent characteristics corresponding to the spectral frequency at the lens 102. For instance, FIG. 10 shows the ratio R'(q)/G'(q) invariably taking on values close to 1 at all pulse rates, indicating that the position of R component focal point and the position of G component focal point are likely to substantially match each other. Accordingly the two ratios other than the ratio R'(q)/G'(q) are used in the decision-making.

If an affirmative decision is made in step S60, the operation returns to step S32 to repeatedly execute the processing. If, on the other hand, a negative decision is made in step S60, the operation proceeds to step S70. In step S70, the control device 104 determines the direction along which the AF lens is to move, i.e., makes a decision with regard to the AF direction. In the embodiment, the AF lens position adjustment data indicating the correspondence of the extents of change in the ratios R'(q)/G'(q), B'(q)/G'(q) and R'(q)/B'(q) of the various color component gradients, to the extent of change in the number of pulses at the AF motor 150 occurring in a range close to the number of pulses applied at the AF motor 150 in correspondence to the point 9a in FIG. 9 or the point 10a in FIG. 10, e.g., around 178 pulses, are temporarily recorded into the SDRAM. For instance, the extents of change in the ratios R'(q)/G'(q), B'(q)/G'(q) and R'(q)/B'(q) of the various color component gradients occurring as the number of pulses at the AF motor 150 increases and decreases by one pulse at a time, relative to the number of pulses applied at the focus match point 10a in FIG. 10, may be temporarily recorded in the SDRAM. In addition, since the correspondence between the extent of change in the number of pulses applied at the AF motor 150 and the extents of change in the ratios R'(q)/G'(q), B'(q)/G'(q) and R'(q)/B'(q) of the various color component gradients changes in correspondence to the subject distance or the characteristics of the lens 102, the AF lens position adjustment data indicating the correspondence between the extents of changes are recorded in correspondence to each specific combination of a subject distance and characteristics of the lens 102. The control device 104 determines the AF direction based upon the ratios R'(q)/G'(q), B'(q)/G'(q) and R'(q)/B'(q) of the various color component gradients at the image edge by referencing the AF lens position adjustment data temporarily recorded in the SDRAM, as described above.

More specifically, the current image edge color component gradient ratios, which may be, for instance, R'(q)/B'(q)=1.05 at a point 10b in FIG. 10 and B'(q)/G'(q)=0.95 at a point 10c in FIG. 10, are compared with the image edge color component gradient ratios; R'(q)/B'(q)=B'(q)/G'(q)=1.00, calculated in the focus-match state that corresponds to the point 10a in FIG. 10. The current image edge color component gradient ratio R'(q)/B'(q)=1.05 is greater than the in-focus image edge color component gradient ratio R'(q)/B'(q)=1.00. The current image edge color component gradient ratio B'(q)/G'(q)=0.95 is smaller than the in-focus image edge color component gradient ratio B'(q)/G'(q)=1.00. In this situation, the 169 pulses currently applied at the AF motor 150, which correspond to the points 10b and 10c, are in a range under the 178 pulses applied at the AF motor 150 in the focus-match state at the point 10a in the example presented in FIG. 10. Accordingly, the camera is determined to be currently in a front focus state and it is decided that the AF direction should be the direction toward the close-up side. In the front focus state, the image capturing plane is at a position 2f, as shown in FIG. 2. Under another set of circumstances, the current image edge color component gradient ratios, which, for instance, may be R'(q)/B'(q)=0.95 at a point 10d in FIG. 10 and B'(q)/G'(q)=1.05 at a point 10e in FIG. 10, are compared with the image edge color component gradient ratios; R'(q)/B'(q)=B'(q)/G'(q)=1.00, calculated in the focus-match state that corresponds to the point 10a in FIG. 10. The current image edge color component gradient ratio R'(q)/B'(q)=0.95 is smaller than the in-focus image edge color component gradient ratio R'(q)/B'(q)=1.00. The current image edge color component gradient ratio B'(q)/G'(q)=1.05 is greater than the in-focus image edge color component gradient ratio B'(q)/G'(q)=1.00. In this situation, the 196 pulses currently applied at the AF motor 150, which corresponds to the points 10d and 10e, is in a range above the 178 pulses applied at the AF motor 150 in the focus-match state at the point 10a. Accordingly, the camera is determined to be currently in a rear focus state and it is decided that the AF direction should be the direction toward the infinity side. In the rear focus state, the image capturing plane is at a position 2r, as shown in FIG. 2. Once the processing in step S70 is completed, the operation proceeds to step S80.

In step S80, the control device 104 sets the drive extent by which the AF motor 150 needs to drive the AF lens until the current image edge color component gradient ratios are adjusted to 1.00 based upon the data temporarily recorded in the SDRAM, which indicate the correspondence of the extents of change in the image edge color component gradient ratios R'(q)/G'(q), B'(q)/G'(q) and R'(q)/B'(q) to the extent of change in the number of pulses applied at the AF motor 150. In the example presented in FIG. 10, the current image edge color component gradient ratios may be; R'(q)/B'(q)=1.05 and B'(q)/G'(q)=0.95. In such a case, the drive extent to which the AF lens needs to be driven in correspondence to 9 pulses at the AF motor 150 is set for the AF motor 150. Likewise, if the current image edge color component gradient ratios is; R'(q)/B'(q)=0.95 and B'(q)/G'(q)=1.05, the drive extent to which the AF lens needs to be driven in correspondence to 18 pulses at the AF motor 150 is set for the AF motor 150. The operation then proceeds to step S90, in which the control device 104 adjusts the focus by driving the AF lens along the AF direction having been determined in step S70 by the drive extent having been set in step S80, before the operation returns to step S30. It is to be noted that if the camera 100 does not have an AF function, the control device 104 should inform the user of the camera 100 of the direction along which the focusing lens needs to move and the extent by which the focusing lens needs to move via the monitor 106.

The following advantages are achieved through the first embodiment of the present invention described above.

(1) The control device 104 detects an edge in correspondence to each color component and calculates edge strength differential values in correspondence to the individual color components. The control device 104 then makes a decision with regard to the direction along which the AF lens needs to move (the direction along which the AF lens needs to be driven) based upon the edge strength differential values having been calculated in corresponding to the various color components. As a result, continuous AF control can be executed while the live view image is on display without having to execute contrast detection for each autofocusing operation, making it possible to speed up the processing.

(2) The control device 104 drives the AF lens via the AF motor along the AF direction determined as described in (1) above. Thus, focus adjustment can be automatically executed while the live view image is on display.

(3) The control device 104 calculates differential values after normalizing the edge strength values having been detected in correspondence to the individual color components so as to ensure that the edge strengths are indicated by values equal to or greater than 0 and equal to or less than 1.

Through these measures, changes in the contrast occurring in the image can be heightened.

(4) The control device 104 executes the processing in step S30 and subsequent steps only after adjusting the focus through the contrast method in step S10 in FIG. 3. This means that since the focus-match state can be sustained with relative ease without having to greatly alter the AF lens position once the focus adjustment through the contrast method is completed, the AF processing can be executed more quickly.

(5) The control device 104 calculates the ratios of the individual color component gradients, i.e., the ratios of the various color component differential values, and decides that the direction toward a point at which two of the ratios having been calculated match each other or a point at which the difference between two of the ratios having been calculated is equal to or less than a predetermined value is the direction along which the AF lens is to move. Through these measures, the direction along which the AF lens needs to move can be determined speedily with a high degree of accuracy.

Second Embodiment

Figure 11:
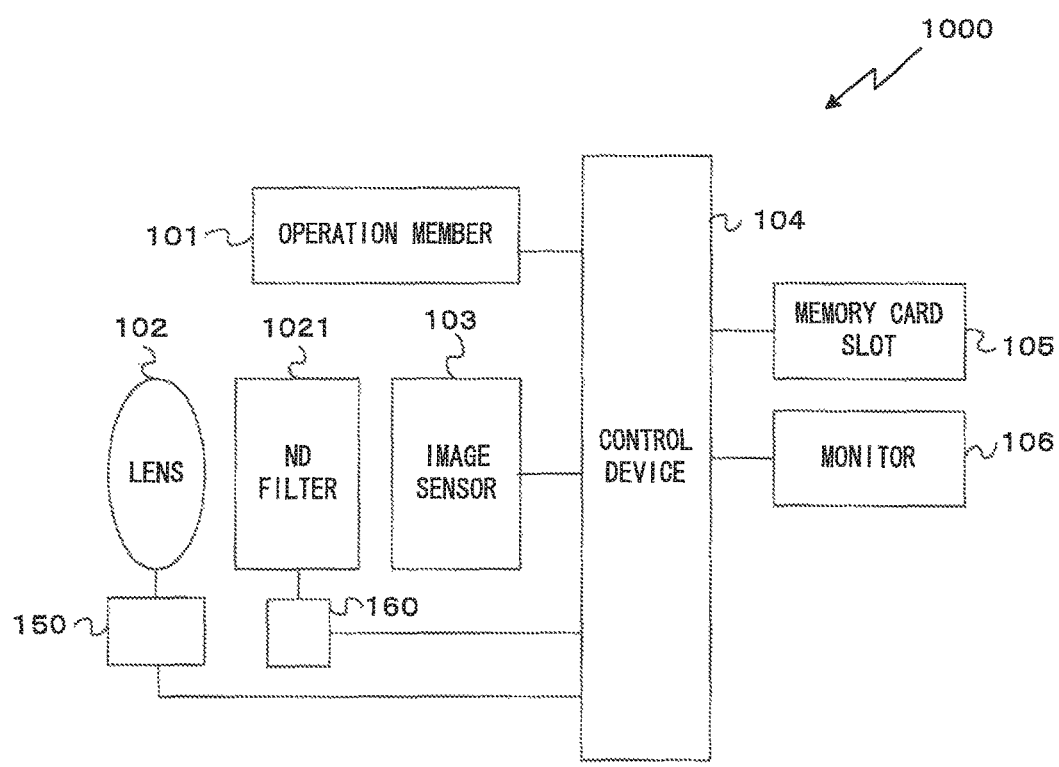

FIG. 11 is a block diagram showing the structure of a camera 1000 achieved in the second embodiment. As does the camera 100 achieved in the first embodiment shown in FIG. 1, the camera 1000 includes an operation member 101, a lens 102, an image sensor 103, a control device 104, a memory card slot 105 and a monitor 106. A description of these members is not provided. The camera 1000 further includes an ND filter 1021 and a filter inserting device 160.

The ND filter 1021 is a neutral density filter used to adjust the amount of incident light via the lens 102. Via the filter inserting device 160, the control device 104 inserts the ND filter 1021 on the optical axis extending between the lens 102 and the image sensor 103 or moves the ND filter 1021 off the optical axis so as to adjust the amount of incident light to enter the image sensor 103.

Figure 12:
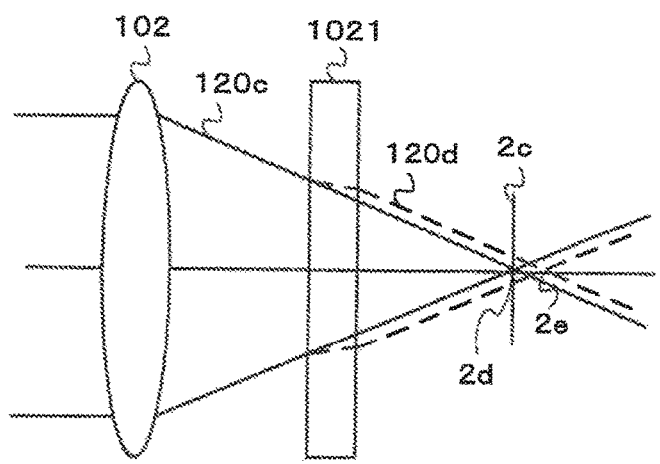

As the ND filter 1021 is inserted on the optical axis while a live view image is displayed at the monitor 106 by the control device 104, the focusing position shifts due to the refractive index of the ND filter 1021. For instance, while the focusing position 2d of subject light 120c is aligned with an image capturing plane 2c of the image sensor 103 prior to insertion of the ND filter 1021, the focusing position 2e of subject light 120d is offset from the image capturing plane 2c once the ND filter 1021 is inserted on the optical axis, as illustrated in FIG. 12.

For this reason, camera manufacturers design an optical system that includes the lens 102 and the ND filter 1021, such as a lens barrel, by taking into account such a shift in the focusing position resulting from the insertion of the ND filter 1021. However, depending upon certain conditions in the environment surrounding the shooting location, such as the humidity and the temperature, the lens barrel may become distorted, and if the ND filter 1021 is inserted on the optical axis while such a distortion is manifesting, the shift in the focusing position attributable to the insertion of the ND filter 1021 may not match the shift assumed in the design phase.

Accordingly, if the shift in the focusing position resulting from insertion of the ND filter 1021 under continuous AF control does not match the shift assumed in the design phase, the frame contrast is bound to be lowered and thus, the focus will need to be adjusted by moving the AF lens along the focus matching direction. The focus adjustment executed in the related art through the contrast method requiring the AF lens moving direction, along which the AF lens needs to be driven to achieve a focus match, to be determined each time by moving the AF lens to either side and detecting the resulting contrast change, will take a significant length of time for the AF processing.

Accordingly, in the embodiment achieved by addressing this issue, a decision is made as to which direction along the optical axis in current AF lens position is offset relative to the focusing position without actually moving the AF lens, even when the ND filter 1021 is inserted on the optical axis. Then, the AF lens is driven toward the focus match position based upon the decision-making results.

In the embodiment, focus adjustment is executed by adopting the contrast method in the related art first, as in the first embodiment, and then a decision is made as to which direction the AF lens needs to be driven in order to move toward the focusing position after the ND filter is inserted on the optical axis extending between the lens 102 and the image sensor 103 positioned at the image capturing plane 2c. A decision is made as to whether the current AF lens position is offset along the optical axis toward the close-up side or toward the infinity side relative to the focusing position at which a focus-match state is achieved by referencing AF lens position adjustment data temporarily recorded in the SDRAM included in the control device 104 so as to factor in the variance among the focusing positions assumed on the optical axis in correspondence to the individual color components due to the axial chromatic aberration, as shown in FIG. 2. The AF lens position adjustment data temporarily recorded into the SDRAM in the embodiment are different from the AF lens position adjustment data described in reference to the first embodiment. This means that if the camera achieved in the first embodiment is also used in the second embodiment, different types of AF lens position adjustment data, each corresponding to either embodiment, are temporarily recorded in the SDRAM, and that a specific type of AF lens position adjustment data is used, depending upon whether or not the ND filter 1021 has been inserted. These measures allow the AF lens moving direction to be determined in steps S70 in FIG. 13 and FIG. 3 through identical decision-making processing and also allow the drive extent to be set in steps S80 in FIGS. 13 and 3 through identical processing.

Figure 13:
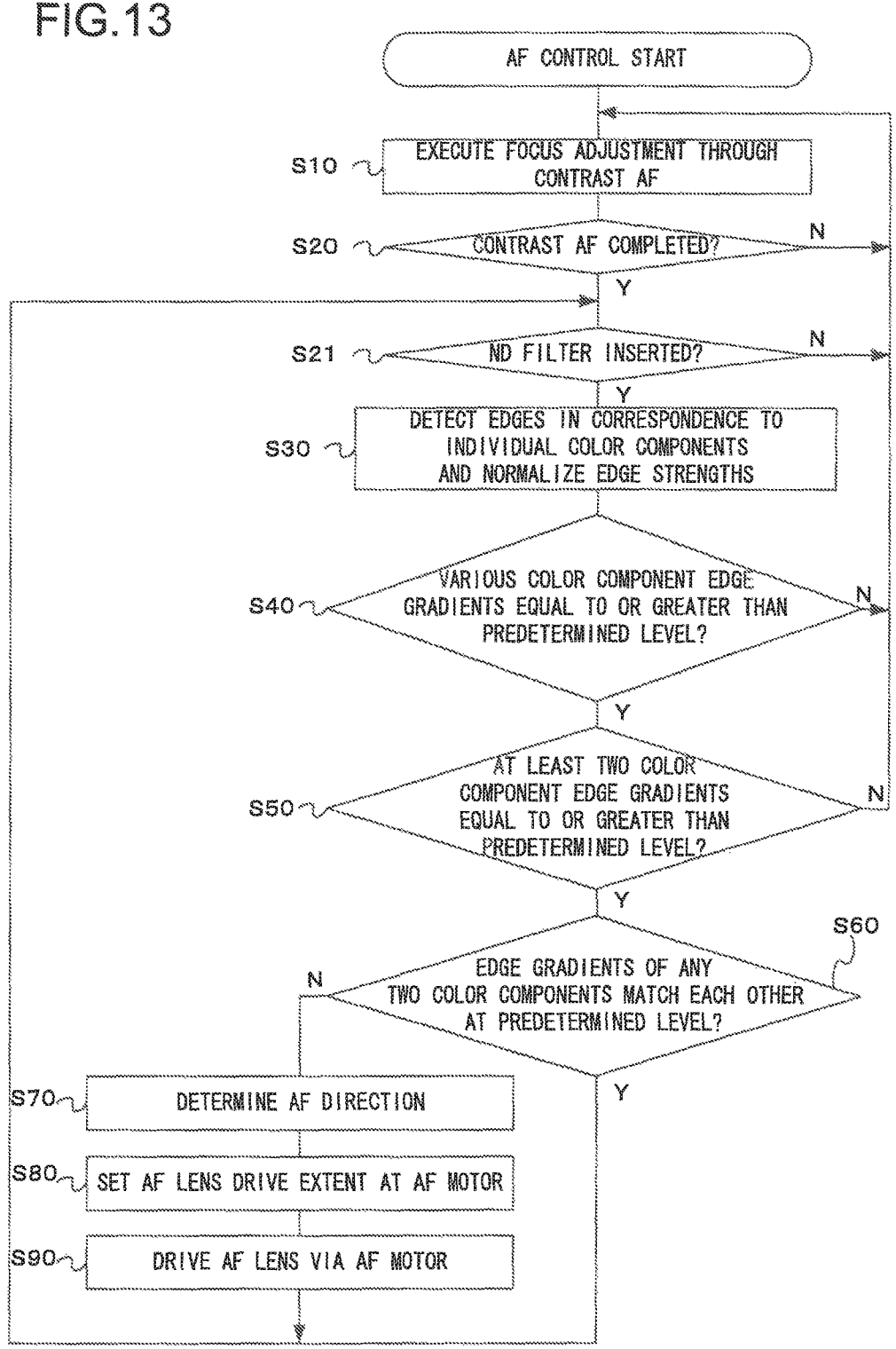

FIG. 13 presents a flowchart of the continuous AF control executed while the live view image is on display in the embodiment. The processing shown in FIG. 13 is executed by the control device 104 based upon a program started up when a live view image data is input from the image sensor 103 starts. The flowchart presented in FIG. 13 is identical to the flowchart presented in FIG. 3, except for the additional decision-making processing executed in step S21 in FIG. 13. Accordingly, the following explanation focuses on the processing executed in step S21 and the processing preceding and following step S21.

Upon making an affirmative decision in step S20, the operation proceeds to step S21.

In step S21, the control device 104 makes a decision as to whether or not the ND filter 1021 has been inserted on the optical axis. If a negative decision is made in step S21, the operation returns to step S10 to repeatedly execute the processing. However, if an affirmative decision is made in step S21, it is determined that the insertion of the ND filter 1021 makes it necessary to execute focus adjustment again and accordingly, the operation proceeds to step S30.

If an affirmative decision is made in step S60, the operation returns to step S21 to repeatedly execute the processing.

In step S90, the control device 104 executes focus adjustment by driving the AF lens via the AF motor 150 along the AF direction having been determined in step S70 by the drive extent having been set in step S80, before the operation returns to step S21.

Through the second embodiment of the present invention described above, advantages similar to those of the first embodiment are achieved. In addition, if the ND filter 1021 is inserted on the optical axis, the control device 104 detects an edge corresponding to each color component and calculates edge strength differential values each in correspondence to a specific color component. Then, based upon the individual color component edge strength differential values thus calculated, the control device 104 determines the direction along which the AF lens needs to move, i.e., determines the drive direction. As a result, even when the focusing position becomes offset due to the refractive index of the ND filter 1021, the correct direction along which the AF lens is to be driven to move toward the focusing position can be determined without having to detect the contrast by actually moving the AF lens along either direction each time, thereby achieving an advantage of improved processing speed.

Variations

It is to be noted that the cameras achieved in the embodiments described above allow for the following variations.

(1) The control device 104 in the embodiments described above makes a decision as to whether or not the image in the current frame has been captured in a state close to the focus-match state by making a decision in step S40 as to whether or not the edge gradients are equal to or greater than a predetermined value of, for instance, 0.4. However, the threshold value (e.g., 0.4) used as the decision-making reference value in step S40 changes in correspondence to the zoom magnification factor of the lens 102. This means that if the lens 102 is a zoom lens with an adjustable zoom magnification factor, the threshold value will need to be altered in correspondence to the current zoom magnification factor. For instance, it is conceivable that the edge gradients calculated in conjunction with a telephoto lens may at all times remain lower than 0.4 and, accordingly, a value smaller than 0.4 will need to be selected as the threshold value. Accordingly, threshold values each corresponding to a specific zoom magnification factor should be calculated in advance and should be temporarily recorded into the SDRAM.

(2) In the embodiments described above, the camera is determined to be in the focus-match state if two ratios among the three ratios such as those shown in FIG. 10, which assume values close to a specific value of, for instance, 1, match each other or if the difference between the two ratios, each represented by a value close to 1, is within a predetermined range. However, there may be situations in which the number of pulses applied at the AF motor 150 when the individual color component edge gradient ratios are each represented by the value of 1 and the number of pulses applied at the AF motor 150 at the focusing position do not match each other. For this reason, an offset may be applied instead of setting the decision-making threshold value to 1.

(3) In the first embodiment described above, the control device 104 in the camera 100 executes the processing shown in FIG. 3. In addition, the control device 104 in the camera 1000 executes the processing shown in FIG. 13 in the second embodiment. However, the present invention is not limited to these examples and it may be adopted equally effectively in conjunction with another device having a focus adjustment function, such as a video camera, a camera system constituted with a camera body and an interchangeable lens, or a personal computer connected with an external camera.

As long as the features characterizing the present invention are not compromised, the present invention is not limited in any way whatsoever to the particulars of the embodiments described above. In addition, the embodiments described above may each be adopted in combination with a plurality of variations.

The disclosures of the following priority applications are herein incorporated by reference:

Japanese Patent Application No. 2009-168991, filed Jul. 17, 2009

Japanese Patent Application No. 2009-168992, filed Jul. 17, 2009

Japanese Patent Application No. 2009-240206, filed Oct. 19, 2009

Japanese Patent Application No. 2009-240207, filed Oct. 19, 2009

The invention claimed is:

1. A focusing device, comprising:
an image capturing unit that captures a subject image via an optical system including a lens for executing focus adjustment and outputs an output signal;
an edge detection unit that detects an edge signal within the output signal in correspondence to each color component among a plurality of color components contained in an image based upon the output signal;
a calculation unit that calculates edge differential values each of which is a differential value of the edge signal in correspondence to each color component; and
a control unit that executes a first control to control a position of the lens to a focusing position at which the subject image captured via the optical system assumed on the image capturing unit is in a focus-match state-based upon the edge differential values and that executes a second control to control the position of the lens to the focusing position based upon a contrast of the image based upon the output signal.

2. The focusing device according to claim 1, wherein the control unit executes the first control to control the position of the lens to the focusing position based upon a comparison of the edge differential values.

3. The focusing device according to claim 1, wherein the control unit calculates two ratios of the edge differential values in correspondence to different color components among the plurality of color components and controls the position of the lens to a position at which the two ratios match each other or in a direction along which a difference between the two ratios decreases.

4. The focusing device according to claim 1, wherein the control unit executes the second control in a situation that controlling the position of the lens to the focusing position via the first control is unable to be performed.

5. A camera, comprising:
the focusing device according to claim 1.

6. The focusing device according to claim 1, wherein the control unit executes the first control when the edge differential values in correspondence to at least two color components are greater than a predetermined value.

7. The focusing device according to claim 6, wherein the control unit changes the predetermined value in correspondence to a magnification factor of the optical system.

8. The focusing device according to claim 1, wherein
the control unit executes the second control when some of the edge differential values are not greater than a predetermined value.

9. The focusing device according to claim 8, wherein
the control unit changes the predetermined value in correspondence to a magnification factor of the optical system.

10. A focusing device, comprising:
an image capturing unit that captures a subject image via an optical system including a lens for executing focus adjustment and outputs an output signal;
an edge detection unit that detects an edge signal within the output signal in correspondence to each color component among a plurality of color components contained in an image based upon the output signal;
a calculation unit that calculates edge gradients each of which corresponds to each color component; and
a control unit that executes a first control to control a position of the lens to a focusing position at which the subject image captured via the optical system assumed on the image capturing unit is in a focus-match state based upon the edge gradients and that executes a second control to control the position of the lens to the focusing position based upon a contrast of the image based upon the output signal.

11. The focusing device according to claim 10, wherein
the control unit executes the first control to control the position of the lens to the focusing position based upon a comparison of the edge gradients.

12. The focusing device according to claim 10, wherein
the control unit calculates two ratios of the edge gradients in correspondence to different color components among the plurality of color components and controls the position of the lens to a position at which the two ratios match each other or in a direction along which a difference between the two ratios decreases.

13. The focusing device according to claim 10, wherein
the control unit executes the second control in a situation that controlling the position of the lens to the focusing position via the first control is unable to be performed.

14. A camera, comprising:
the focusing device according to claim 10.

15. The focusing device according to claim 10, wherein
the control unit executes the first control when the edge gradients in correspondence to at least two color components are greater than a predetermined value.

16. The focusing device according to claim 15, wherein
the control unit changes the predetermined value in correspondence to a magnification factor of the optical system.

17. The focusing device according to claim 10, wherein
the control unit executes the second control when some of the edge gradients are not greater than a predetermined value.

18. The focusing device according to claim 17, wherein
the control unit changes the predetermined value in correspondence to a magnification factor of the optical system.

* * * * *